Feb. 16, 1971    W. W. COOPER IV., ET AL    3,563,889
INTEGRAL SEMIPERMEABLE MEMBRANE AND BRAIDED SUPPORT TUBE
Filed Jan. 3, 1969
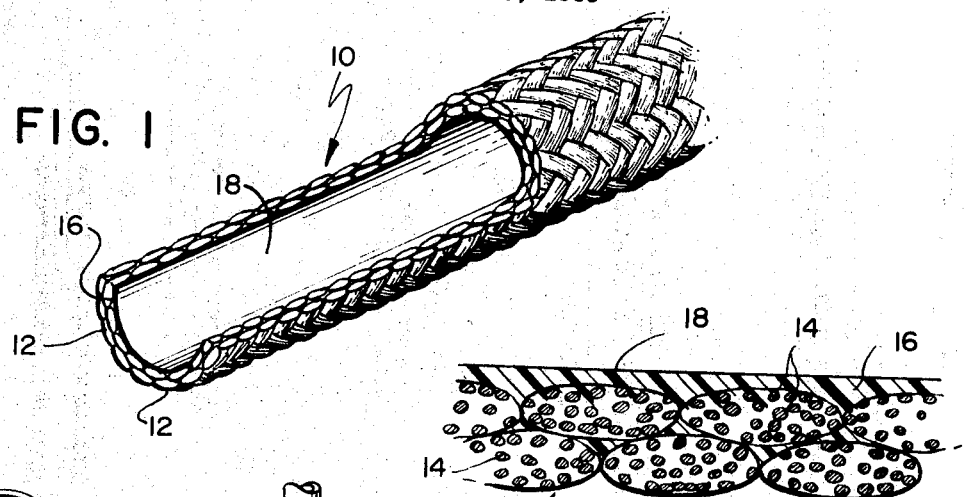
FIG. 1
FIG. 2
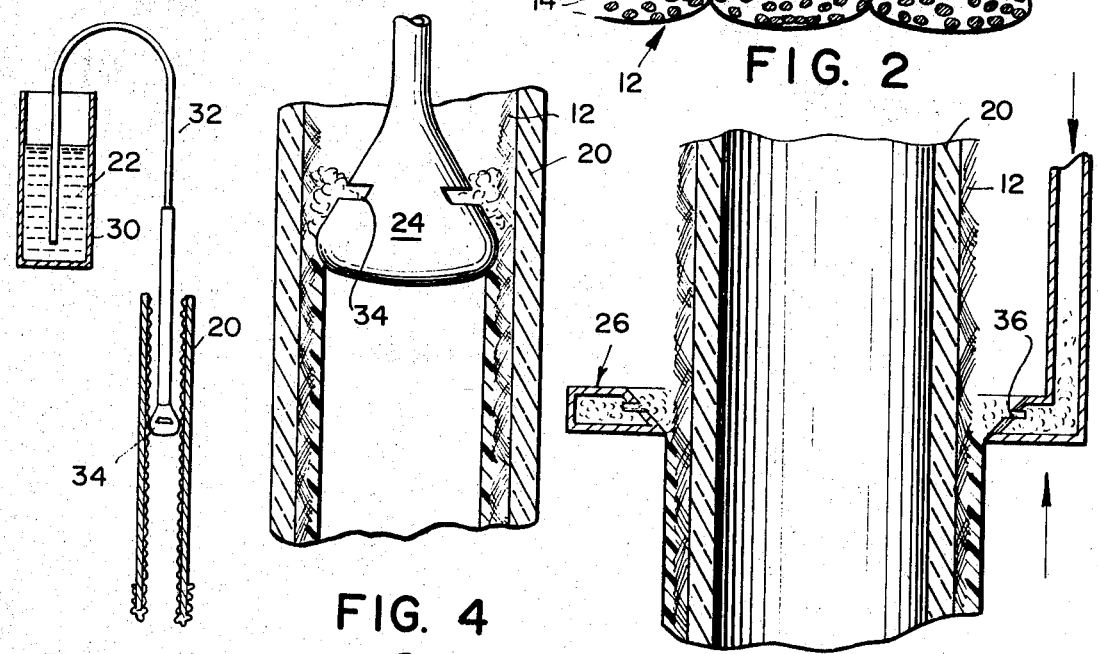
FIG. 3
FIG. 4
FIG. 5
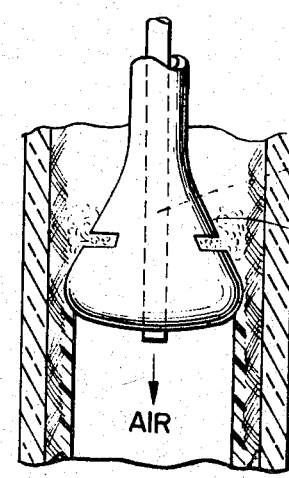
FIG. 6
INVENTORS
WILLIAM W. COOPER
RUSSELL W. PIERCE
BY Richard J. Crowley
ATTORNEY

United States Patent Office 3,563,889
Patented Feb. 16, 1971

3,563,889
INTEGRAL SEMIPERMEABLE MEMBRANE AND BRAIDED SUPPORT TUBE
William W. Cooper IV, Sudbury, and Russell W. Pierce, Hanover, Mass., assignors to Abcor, Inc., Cambridge, Mass., a corporation of Massachusetts
Continuation-in-part of application Ser. No. 658,168, Aug. 2, 1967. This application Jan. 3, 1969, Ser. No. 816,133
(Filed under Rule 47(a) and 35 U.S.C. 116)
Int. Cl. B01d 13/00
U.S. Cl. 210—23          11 Claims

ABSTRACT OF THE DISCLOSURE

An integrally supported semipermeable membrane is composed of a tubular braided fabric impregnated with a polymeric film forming composition, and carries on at least one surface a layer of the polymer with the surface of the polymer carrying an active layer which provides the separation characteristics of the membrane.

---

The application is a continuation-in-part of application Ser. No. 658,168, filed Aug. 2, 1967, now abandoned.

This invention is directed to novel integrally supported membranes and more particularly to tubular semipermeable membranes and to methods and apparatus for preparing such membranes.

Semipermeable membranes are becoming increasingly important for use in separating fluids from solids, particularly dissolved solids, for example, in the desalinization of water, in the manufacture of industrial chemicals and in the medical and pharmaceutical industries. A particularly useful employment of such semipermeable membranes is for reverse osmosis applications. Various methods have been employed to reinforce the membrane itself which cannot withstand the necessary pressures which are encountered in such operations. A recent article describes one method for supporting a semipermeable membrane ("A composite Tubular Assembly for Reverse Osmosis Desalination," Loeb, p. 35–49, Desalination, 1 (1966).) As described in this article the semipermeable membrane is first separately formed and then wrapped with filter paper and nylon fabric in a cumbersome and time consuming process. The fabrication technique described in the article is deficient in that it fails to produce a film having uniform surface and thickness characteristics with the qualities necessary for a satisfactory integrally supported semipermeable membrane.

Semipermeable membranes are formed from polymeric films deposited from aqueous, solvent or melt compositions. After the liquid film composition is deposited on the substrate the microporous film structure is formed by evaporation of the fluid and the resulting gelling of the polymer. Unlike extrusion, formation of the film by evaporation results in a thin, compact, consolidated surface layer supported by a spongy underlayer. The selectivity in the diffusion and permeation processes is attributed to this consolidated surface layer which is characterized as the "active" layer by the art. The remainder of the film, the spongy underlayer, which makes up approximately 99.8% of the total film layer provides substantially no selection or resistance to flow, thereby permitting the fluids to pass through this layer at a relatively rapid rate. The speed of the separation process is governed by the thickness of the consolidated surface layer. Since this layer is relatively thin in relation to the remainder of the film, separations employing such membranes are relatively fast. For convenicence herein the consolidated surface layer will be referred to as the active layer, which is the term employed in the art (see for example, U.S. Pat. No. 3,290,286).

We have now discovered a novel, efficient, integrally supported membrane which is prepared by a simple and economical method. The novel product of the present invention comprises a tubular braided material impregnated with, and covered on at least one surface with a microporous polymeric material, said polymeric material having an active layer on at least one outer surface. The film itself is formed of conventional material known to be employed in forming such membranes.

The tubular supporting material is a fabric composed of a multiplicity of continuous monofilamentary material of relatively small diameter which is twisted together or otherwise consolidated to form strands. The strands are then woven or knitted to form a closely braided tubular structure. It is essential that the strands employed to make up the material be characterized by a relatively smooth surface which is free from "fuzz"; that is, short fiber ends which project from the surface of the strand. Such projections would penetrate the surface of the microporous film deleteriously affecting the semipermeable efficiency of the membrane.

The employment of a multiplicity of continuous monofilaments in the braided structure is critical to the present invention since it permits the adjacent strands to lie close together, thereby presenting an essentially flat surface. The relative smoothness of the surface allows the application of a relatively thinner coating of polymer than would otherwise be necessary to cover protuberances; and prevents "blow-outs" at open points, i.e., failure of the polymer layer at points wherein the polymer is not directly supported by underlying material. By contrast, if a weave of, e.g., wire mesh were emloyed, the inability of the mesh to compress would cause surface irregularities at the crossover points which would require a polymer layer excessively thick to cover these irregularities. In addition, irregularities have been found to trap air in the casting process with consequent formation of weak spots. In the present invention, since the strands are composed of a multiplicity of fibers twisted together, these problems are eliminated with the strands themselves becoming impregnated with polymer.

No reinforcement, as by resins, etc., of the tubular material is employed in the present invention since the braided configuration provides the necessary strength and reinforcement. Further, the membranes neither require nor possess the property of rigidity, thus, minimizing the possibility of damage due to shock or accident.

Referring now to the drawings wherein:

FIG. 1 is an enlarged view partly in section of the novel self-supported membrane of the present invention;

FIG. 2 is a cross-sectional view of the membrane;

FIG. 3 is a schematic view illustrating the novel process employed in forming the membranes of the present inventilon;

FIG. 4 is a cross-sectional drawing illustrating the novel process of the present invention and the novel casting bob employed in said process;

FIG. 5 is a cross-sectional drawing illustrating an alternative method of forming the membrane of the present invention;

FIG. 6 is a cross-sectional drawing illustrating the preparation of the novel self-supported membrane of the present invention employing the novel casting bob.

The novel product of the present invention is il'ustrated in FIGS. 1 and 2 wherein tubular membrane 10 is composed of a braided fabric of fibers 12 wherein the fibers are made up of continuous monofilaments 14. The braided supporting fabric is impregnated with polymer 16 which has an active layer 18.

As examples of suitable monofilamentary material which can be employed satisfactorily in the present invention mention may be made of rayon, nylon, polyesters (Dacron), polyolefins, e.g., polyethylene and polypropylene, acrylics, Teflon, and the like. For very high pressure applications high strength materials such as steel and glass fibers are employed. Therefore, for substantially any application the tubular semipermeable membranes of the present invention are used without additional supporting means. However, if desired, such additional support means may be employed for particular applications.

The pressure ranges at which the membranes are employed is limited only by the braided material employed. For example, with rayon, pressures of about 10 to 50 p.s.i.g. are employed. Significantly higher pressures are employed with steel or glass fibers.

Polymeric materials employed in forming the semipermeable membranes are conventional and well known to the art. The particular material is not critical and a wide variety of polymers can be employed. The polymers are deposited from casting solution which is composed of a film forming polymer, a solvent for said polymer and a third material which is miscible with the solvent, but is a nonsolvent or poor solvent for the polymer. The particular membrane material and supporting material should be selected to insure adequate adhesion.

The novel integrally supported membrane of the present invention is formed by applying to a tubular, closely-woven structure composed of strands of continuous monofilaments, a casting solution in sufficient quantity to impregnate the supporting material and to form a smooth, thin film layer on at least one surface. Evaporative drying is then applied to the structure to form the active layer on the surface of the polymer.

The level of impregnation is not critical. Only sufficient penetration of the fabric to insure adequate support and adhesion to the polymer material containing the active layer is necessary. In a preferred embodiment sufficient casting solution is employed to completely penetrate the fabric. Complete penetration of the fabric provided the greatest degree of support and adhesion. That portion of the membrane comprising the spongy porous polymer layer surrounding the support fabric will provide substantially no axial or radial flow resistance in the employment of the membrane and, as stated above, will not compact under pressure applications. Because of the highly porous nature of the polymeric material and the nature of the braided material, the problem of axial flow resistance is substantially nonexistent. Thus, an unimpregnated central layer is not necessarily to provide axial flow between the polymeric material and the supporting structure as is necessary in the prior art. The structure of the braided material permits the high degree of impregnation by the polymer. Substantially all the flow resistance of the structure results from the active layer. The thickness of the surface polymeric layer may vary over a wide range; provided that the flow resistance is not excessive. Preferably, the surface layer is less than 5 mils in thickness and the active layer is 0.25 micron or less.

Unlike the prior art in which preformed membranes are supported by sintered steel backing or the like, substantially no compaction of the spongy underlayer of the membrane occurs in pressure applications such as reverse osmosis. In effect we have no backing; our support is integral with the membrane. The fibers absorb the pressure and the spongy underlayer is not compressed or compacted.

In a preferred method of preparing the membranes of the present invention the braided supporting material is first formed into a tubular configuration, for example, around a glass tube. The supporting material is then wet with a fluid, e.g., with water and, if desired, stiffened by the application of starch, carboxy-methyl-cellulose, polyvinyl pyrrolidone or other conventional fabric stiffening material known to the art. It should be understood that the fluid is not limited to water but can be any appropriate fluid; in the case of rayon, water is preferred; in the case of polyethylene, toluene is preferred. The supporting material is then dried, preferably at elevated temperatures. The tube around which the supporting material was formed is then removed and the tubular supporting material is inserted into a hollow tube of slightly greater diameter to provide the necessary support and shape during the application of the polymeric layer. A casting bob is then inserted inside the tubular supporting material. The dimensions of the casting bob and the supporting material are selected to provide the desired deposition of the polymeric material. Polymeric casting solution is then provided to the upper surfaces of the casting bob either by an external feed tube or by the novel casting bob of the present invention. The casting solution is then applied to the tubular supporting fabric either by drawing the casting bob up the interior of the tubular supporting material or by maintaining the casting bob stationary and moving the tubular supporting material downwardly past the casting bob. In a third alternative both the casting bob and the tubular supporting fabric can be moved in opposite directions at the same time. The casting solution flows around the edges of the bob and onto the film. The clearance between the casting bob and the fabric walls determines the thickness of the surface layer on the fabric.

The rate of the relative motion of the casting bob and/or the tubular supporting material is not critical. The rate of motion should be such, however, that the desired amount of polymer is applied to the tubular material. A too rapid motion may result in insufficient deposition of the polymer. The polymeric material is then air dried to form the active layer. Subsequent to the drying step the thus formed self-supported membrane and the supporting tube in which it was formed is immersed in water. In the water the self-supporting membrane is released from the wall of the supporting tube and readily removed.

The rate of drying is not critical; however, the flux rate and the selectivity of the membrane can be controlled by the drying conditions selected. For example, a relatively short drying rate generally provides a less selective membrane material whereas a prolonged drying operation will produce a highly selective membrane material.

The novel semipermeable membranes of the present invention can now be handled according to conventional procedures. For example, the membranes are immersed in water to remove the solvent and nonsolvent of the casting solution by replacement with the water. The finished membrane may be surface treated thermally or by solvents and the like in order to provide a specific degree of selectivity. The selectivity can also be controlled by the incorporation into the liquid casting solution of materials, e.g., tellurium tetrabromide or magnesium perchlorate, which are subsequently removed by the water after formation of the membrane. The characteristics of the membrane can be predetermined by the composition of the casting solution. For example, variation of the proportions of solvent, the presence of swelling agents, dopants, or diluents and the like, can effect the relative selectivity of the finished membrane. As mentioned above, the membrane material may be prepared from any suitable film-forming polymeric material known to the art such as cellulose esters, cellulose ethers, denitrofied nitrocellulose, phenol aldehyde, urea aldehyde, acrylics, elastomers and the like. A particularly preferred class of materials are the cellulose esters, more preferably, cellulose acetate and polyion complex resins, e.g., sulfonated polystyrene. The term casting solution, as used herein, is intended to refer to solvent solutions, or aqueous polymeric dispersions, and melts. A typical casting solution includes, for example, 25 percent of cellulose acetate, 30 percent of formamide, and 45 percent of acetone. A membrane of this composition on a rayon braided support has been found to possess a flow rate at 10 p.s.i.g. of 20 gallons of protein solution per square foot per day as compared with 1500 p.s.i.g. for prior art membranes.

We have discovered a novel casting bob which is particularly suitable for use in forming semipermeable membranes, but which is also useful for the deposition of any polymer material on the inside of the tubular structure.

The novel bob comprises a substantially circular hollow body with a lower surface and side walls sloping inwardly and upwardly from the lower surface. The side walls contain slots or apertures spaced apart from each other from which coating solution contained in the hollow cavity of the bob is expelled to flow around the bob and onto the adjacent surface to be coated.

The bob may be conventionally supported, as by a wire, with an adjacent conduit for introducing polymeric casting solution into the cavity defined by the walls and the lower surface. In a preferred embodiment, however, the tube which carries polymeric solution to the casting bob also provides the support for the bob. If the method of employing the casting bob involves the motion of a tube passing a stationary bob, the supply tube can be made of rigid material such as glass or stainless steel tubing. However, if a moving bob is desired a flexible supply tube is employed. Preferably, the polymeric solution is under pressure.

In a particularly preferred embodiment the casting bob contains means for introducing an evaporative medium such as air, or other drying gas or liquid, to that portion of the tube upon which polymer has been deposited. The drying atmosphere is provided by a tube which leads through the bob and exists on the lower surface of the bob, thereby providing the drying atmosphere to the polymeric layer immediately after it has been deposited on the tube walls by the passage of the bob. In a particularly preferred embodiment concentric tubes lead to the casting bob; one of said tube exits in the cavity of the casting bob and carries polymeric material and to and the other exit in the lower face of said casting bob to provide the drying atmosphere.

As stated above the casting bob possesses inwardly sloping walls; preferably the casting bob are tear dropped shape or pear shaped.

One method of forming the novel membrane of the present invention is illustrated in FIGS. 3 and 4 which show a tubular braided fabric 12 supported by the inner surfaces of a glass tube 20 to maintain the tubular configuration. Polymeric casting solution 22 is passed from reservoir 30 through conduit 32 to casting bob 24 from whence it is fed to the upper surfaces of the casting bob into and onto the adjacent braided supporting fabric to impregnate the fabric and layer 16. As illustrated, the supporting tube 20 and tubular support material 12 are maintained in a stationary position and the casting bob is drawn through the tube in the direction of the arrow.

FIG. 5 illustrates an alternative method of forming the membrane of the present invention wherein the active layer is on the outer surface of the fabric. Glass supporting tube 20 is inserted inside the braided fabric and annular casting knife 26 rings the outer surface of the braided material depositing casting solution through ports 36 to form polymeric layer 16.

In a particularly preferred embodiment, the evaporative drying which forms the active layer is applied to the polymeric material immediately after it has been deposited on the tubular supporting material. By employing a moving current of drying air, greater efficiencies are achieved in the drying operation as well as providing for consistency of separation characteristics through the membrane by the uniform removal of the solvent employed in the casting solution. The above-mentioned high efficiency drying can be achieved by employing the novel casting bob shown in FIG. 6. The casting bob, which is hollow and contains a passage way for the casting solution to pass through it and out ports 34, also contains a tube 28 which expels air from the lower surface of the casting bob thus providing the evaporative drying conditions to polymeric film 16 which has been applied to the tubular supporting material by the passage of the casting bob.

The novel self-supported membranes of the present invention are suitable for use in a wide variety of applications. The membranes are particularly useful in protein ultra filtration where rejection of a high molecular weight component is desired. Other particularly useful applications include antibiotic separation concentration and purification, food concentration, sugar and starch separation, protein separation from whiskey still bottoms, and various other filtrations. Other examples of separatory operations to which the membranes can be applied are described in U.S. Pats. Nos. 3,228,876 and 3,228,877, which are incorporated by reference herein in their entirety.

What is claimed is:

1. An integrally supported tubular membrane comprising, in sequence, a tubular braided material composed of a multiplicity of continuous monofilaments formed into strands, the monofilaments essentially free of short fiber ends projecting from the surface of the strands, the strands overlapping to form at least a double layer of braided strands with the adjacent strands close together to present an essentially flat surface, a microporous polymeric layer and an active layer on at least one surface of said polymeric layer, said tubular braided material being at least partly impregnated with said polymeric material.

2. A product as defined in claim 1 wherein said active layer is located on the outer wall of said tubular membrane.

3. A product as defined in claim 1 wherein said polymeric layer is less than 5 mils in thickness.

4. A product as defined in claim 1 wherein the layer of braided strands is a double layer of braided strands wherein the strands are generally elliptically shaped, the elliptical strands of one layer overlapping the strand interstices of the other layer to present an essentially smooth, flat surface on both sides of the strands.

5. A product as defined in claim 1 wherein said tubular braided material is completely impregnated with said polymeric material.

6. The product as defined in claim 1 wherein said active layer is located on the inner wall of said tubular membrane.

7. A product as defined in claim 6 wherein said monofilaments are selected from the group of monofilament materials consisting of rayon, nylon, polyester, polyolefin, acrylic, Teflon and combinations thereof.

8. A product as defined in claim 1 wherein said polymeric material is a cellulose ester.

9. A product as defined in claim 8 wherein said cellulose ester is cellulose acetate.

10. An integrally supported tubular membrane consisting essentially of, in sequence, a tubular braided material, composed of a multiplicity of continuous monofilaments formed into strands, the monofilaments essentially free of short fiber ends projecting from the surface of the strands, the strands overlapping to form at least a double layer of braided strands with the adjacent strands close together to present an essentially flat surface, a microporous polymeric layer of a cellulose ester having a cast active layer on the inner surface of said tubular material, said tubular braided material being at least partly impregnated with said polymeric material, said polymeric material comprising the sole impregnant for said braided material.

11. The method of separating a protein solution into relatively high and relatively low molecular weight fractions which method comprises: introducing the solution to be separated into an integrally supported tubular membrane, comprising in sequence, a tubular braided material composed of a multiplicity of continuous monofilaments formed into strands, the monofilaments essentially free of short fiber ends projecting from the surface of the strands, the strands overlapping to provide at least a double layer of strands with the adjacent strands close together to present an essentially flat surface, a microporous polymeric layer and an active layer formed by casting a coating solution containing the polymer on the inner surface of said tubular material, said tubular braided material being at least partly impregnated with said polymeric material whereby only the solution of relatively low molecular weight flows through said membrane.

References Cited

UNITED STATES PATENTS

| | | | |
|---|---|---|---|
| 2,864,506 | 12/1958 | Hiskey | 210—22X |
| 3,457,170 | 7/1969 | Havens | 210—490X |
| 1,060,065 | 4/1913 | Cottrell | 210—500X |
| 2,197,805 | 4/1940 | Lovett | 210—500X |
| 3,332,815 | 7/1967 | Havens | 156—175 |
| 3,341,024 | 9/1967 | Lowe et al. | 210—490 |
| 3,421,782 | 1/1969 | Kalish et al. | 285—248 |

FOREIGN PATENTS

| | | | |
|---|---|---|---|
| 548,246 | 11/1957 | Canada | 210—321 |
| 295,120 | 4/1965 | Netherlands | 210—321 |

FRANK A. SPEAR, JR., Primary Examiner

U.S. Cl. X.R.

210—321, 490